(12) United States Patent
Schäuble et al.

(10) Patent No.: US 11,012,116 B2
(45) Date of Patent: May 18, 2021

(54) FIELD DEVICE ADAPTER FOR WIRELESS DATA TRANSFER

(71) Applicant: Endress+Hauser SE+Co. KG, Maulburg (DE)

(72) Inventors: Harald Schäuble, Lörrach (DE); Max Bauer, Rheinfelden (DE); Ralph Stib, Schönau (DE); Marco Buscemi, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/627,901

(22) PCT Filed: Jun. 19, 2018

(86) PCT No.: PCT/EP2018/066250
§ 371 (c)(1),
(2) Date: Dec. 31, 2019

(87) PCT Pub. No.: WO2019/007668
PCT Pub. Date: Jan. 10, 2019

(65) Prior Publication Data
US 2020/0186196 A1 Jun. 11, 2020

(30) Foreign Application Priority Data
Jul. 4, 2017 (DE) ..................... 10 2017 114 851.5

(51) Int. Cl.
*H04B 3/54* (2006.01)
*G05B 19/042* (2006.01)
*H04Q 9/00* (2006.01)

(52) U.S. Cl.
CPC ......... *H04B 3/542* (2013.01); *G05B 19/0423* (2013.01); *H04Q 9/00* (2013.01);
(Continued)

(58) Field of Classification Search
CPC .......... G05B 2219/25428; G05B 2219/21061; H04B 3/542; H04L 27/10; H04L 41/0806;
(Continued)

(56) References Cited

U.S. PATENT DOCUMENTS

2005/0245291 A1 11/2005 Brown et al.
2006/0092039 A1* 5/2006 Saito ................. H04L 12/10
340/6.1
(Continued)

FOREIGN PATENT DOCUMENTS

CN 1768463 A 5/2006
CN 1950770 A 4/2007
(Continued)

OTHER PUBLICATIONS

Analog Devices, 2-Wire Loop-Powered Transmitter Solution, Project Code: APM-TwoWire-Transmitter—2013 (Year: 2013).*

*Primary Examiner* — Aristocratis Fotakis
(74) *Attorney, Agent, or Firm* — Mark A. Logan; Endress+Hauser (USA) Holding Inc.

(57) ABSTRACT

Disclosed is a field device adapter for wireless data transfer, comprising: an adapter housing having a first and a second end, the first end such that the field device adapter can be mechanically connected to a field device and the second end such that a two-wire cable can be connected to the field device adapter. The adapter housing also having an adapter chamber; a supply electronics unit arranged in the adapter chamber and designed to provide a supply voltage via a voltage tap; an adapter electronics unit; and an adapter connection cable at the first end for connecting the adapter electronics to a field device electronics. The adapter electronics are designed to communicate the two-conductor signals between the field device electronics and the two-
(Continued)

conducting-wire cable and also to convert the two-conductor signals into radio signals or vice versa.

15 Claims, 2 Drawing Sheets

(52) U.S. Cl.
CPC .............. *G05B 2219/21061* (2013.01); *G05B 2219/25428* (2013.01)

(58) Field of Classification Search
CPC ..... H03K 9/06; H03K 7/06; H02J 1/06; H02J 1/00
See application file for complete search history.

(56) References Cited

U.S. PATENT DOCUMENTS

| | | | |
|---|---|---|---|
| 2008/0268784 A1 | 10/2008 | Kantzes et al. | |
| 2008/0294915 A1* | 11/2008 | Juillerat | H04L 12/40032 713/300 |
| 2009/0138104 A1* | 5/2009 | Huck | H04L 61/6004 700/75 |
| 2009/0253388 A1* | 10/2009 | Kielb | G08C 17/02 455/117 |
| 2009/0309558 A1* | 12/2009 | Kielb | G05B 19/0423 323/234 |
| 2009/0311975 A1* | 12/2009 | Vanderaa | G05B 19/4185 455/90.3 |
| 2009/0311976 A1* | 12/2009 | Vanderaa | G08C 17/04 455/90.3 |
| 2011/0053526 A1 | 3/2011 | Strei et al. | |
| 2011/0134817 A1* | 6/2011 | Probst | G05B 19/0423 370/311 |
| 2011/0148511 A1* | 6/2011 | Seiler | G05B 19/0423 327/540 |
| 2011/0282467 A1* | 11/2011 | Schulte | G05B 19/0423 700/22 |
| 2012/0235479 A1 | 9/2012 | Seiler et al. | |
| 2013/0082667 A1* | 4/2013 | Sinreich | H02J 7/345 323/234 |
| 2013/0107919 A1* | 5/2013 | Burns | H03K 7/06 375/219 |
| 2015/0155079 A1* | 6/2015 | Martins Neto | H01B 17/586 174/153 R |
| 2016/0099841 A1* | 4/2016 | Tiwari | H04L 41/0806 370/255 |
| 2016/0299478 A1* | 10/2016 | Junk | G05B 15/02 |
| 2017/0019721 A1 | 1/2017 | Digiulian | |
| 2018/0151977 A1* | 5/2018 | Moser | H01R 13/5202 |

FOREIGN PATENT DOCUMENTS

| | | |
|---|---|---|
| CN | 101548247 A | 9/2009 |
| CN | 101669153 A | 3/2010 |
| DE | 102009047535 A1 | 6/2011 |
| DE | 102013109096 A1 | 2/2015 |
| WO | 2009040191 A1 | 4/2009 |
| WO | WO-2016207014 A1 * 12/2016 | ........... H01R 13/527 |

* cited by examiner

FIELD DEVICE ADAPTER FOR WIRELESS DATA TRANSFER

CROSS-REFERENCE TO RELATED APPLICATIONS

The present application is related to and claims the priority benefit of German Patent Application No. 10 2017 114 851.5, filed on Jul. 4, 2017 and International Patent Application No. PCT/EP2018/066250, filed on Jun. 19, 2018, the entire contents of which are incorporated herein by reference.

TECHNICAL FIELD

The invention relates to a field device adapter for wireless data transfer and to an automation field device for capturing and/or controlling a process variable.

BACKGROUND

In automation technology, especially in process automation, field devices are widely used which serve for the determination, optimization and/or influencing of process variables. Sensors, such as fill-level measuring devices, flow meters, pressure and temperature measuring devices, pressure and temperature measuring devices, conductivity measuring devices, etc., are used for capturing the respective process variables, such as fill level, flow rate, pressure, temperature, and conductivity. Actuators, such as, for example, valves or pumps, are used to influence process variables. The flow rate of a fluid in a pipeline section or a filling level in a container can thus be altered by means of actuators. Field devices, in general, refer to all devices which are process-oriented and which supply or process process-relevant information. In the context of the invention, field devices also refer to remote I/Os (electrical interfaces), radio adapters and/or, in general, devices that are arranged on the field level.

A variety of such field devices are manufactured and marketed by the Endress+Hauser company.

Two-wire field devices which are connected via a two-wire line to a superordinate unit, for example to a control unit PLC, are currently still in common use in a large number of existing automation systems. Two-wire field devices are designed in such a way that measurement or control values as a main process variable are communicated, i.e. transmitted, in analog form via the two-wire line or the two-wire cable as a 4-20 mA signal. The HART protocol in particular has proven successful for the transmission of all other data, whereby a frequency signal as a digital two-conductor signal for data transmission is superimposed on the analog current signal of 4-20 mA. According to the HART protocol, data transfer is effected by switching back and forth between 1200 Hz and 2400 Hz, wherein the low frequency stands for a logical "0" and the higher frequency stands for a logical "1". In this way, the analog current signal, which changes only slowly, is unaffected by the frequency superposition, so that it is combined by means of HART analog and digital communication.

In the course of the increasing digitization, however, it is desirable that the data can be transferred with the field device not only via the two-wire line, that is to say purely wire-bound, but also communicated wirelessly. This may be to transfer the data wirelessly to a database, for example a cloud database, and make it available there, or to transfer data wirelessly between the field device and a mobile control unit, for example in order to parametrize the field device wirelessly via the mobile control device.

SUMMARY

It is thus an object of the invention to propose a possibility by means of which existing field devices, which are designed for exclusively wire-bound data transfer, can be retrofitted for wireless data communication.

The object is achieved by a field device adapter for wireless data transfer and an automation field device.

With regard to the field device adapter, the object is achieved by a field device adapter for wireless data transfer, comprising at least the following:
  an adapter housing having a first end and a second end, the first end being designed in such a way that the field device adapter can be mechanically connected to a field device, preferably a cable gland connection of a field device, and the second end is designed in such a way that a two-wire line for data transfer can be electrically connected to the field device adapter, the adapter housing also having an adapter chamber between the first and second ends;
  a supply electronics unit, which is arranged in the adapter chamber and which is designed to provide a supply voltage by means of a voltage tap at the two-wire line that is connectable at the second end;
  at least one adapter electronics unit arranged in the adapter chamber and to which the supply voltage is fed;
  an adapter connection cable located at the first end for electrically connecting the adapter electronics unit to a field device electronics unit of the field device that is connectable at the first end;
  wherein the adapter electronics unit is designed to communicate the two-conductor signals between the field device electronics unit electrically connectable at the first end by means of the adapter connection cables and the two-conducting-wire cable connectable at the second end, and wherein the adapter electronics unit is also designed to convert the two-conductor signals into radio signals or vice versa and to transmit or receive the same by radio.

For example, data can be transferred to a cloud database via the field device adapter according to the invention. For the purposes of the present invention, a cloud database is to be understood as a database which can be contacted by a user via the internet. In this case, provision can be made for the database to have an application, for example for visualizing the data which are stored in the database. From his device, for example a PC or a mobile terminal, a user can access the database application and thus the data via the internet.

According to the present invention, the terms two-wire field devices and two-wire line should also be understood as being synonymous with four-wire field devices and four-wire lines.

An advantageous embodiment of the field device adapter provides for the adapter electronics unit to be designed to convert digital two-conductor signals, which are based on a HART protocol, into radio signals or vice versa.

A further advantageous embodiment of the field device adapter provides for the adapter electronics unit to have at least one HART modem which carries out the conversion of the digital two-conductor signals, which are based on a protocol or the HART protocol, into radio signals or vice versa. In particular, the embodiment can provide for the HART modem to be designed as a secondary master in accordance with a protocol or the HART protocol.

In turn, a further advantageous embodiment of the field device adapter, provides that the adapter electronics unit further comprises at least a communication resistor, which is arranged between two-wire line connectable to the second end and the adapter connection cable located at the first end, wherein the adapter electronics unit is designed to receive the radio signals and with the aid of the communication resistor to convert the received radio signals into two-conductor signals and to route the converted two-conductor signals to the field device electronics unit that is electrically connectable by the adapter connection cable. In particular, the embodiment can provide for the adapter electronics unit to be further designed to convert analog two-conductor signals based on a 4-20 mA standard into radio signals or vice versa with the aid of the communication resistor.

A further advantageous embodiment of the field device adapter provides for the adapter electronics unit to be further designed to convert the digital two-conductor signals based on a HART protocol, into radio signals in accordance with one of the following radio protocols:
a Bluetooth protocol,
a 6LoWPAN protocol,
a WirelessHART protocol, and/or
a 6TiSCH protocol.

A further advantageous embodiment of the field device adapter provides for the supply electronics unit to comprise a voltage reference, at least one diode, preferably a z diode, or a resistor, and for the voltage tapping to take place via the voltage reference, the at least one diode, preferably the z diode, or the resistor. In particular, the embodiment can provide for the voltage reference to be designed to provide the supply voltage independently of a two-wire current of the two-wire line.

Furthermore, the embodiment can provide for the at least one diode, preferably the z diode, to be arranged in such a way that a cathode of the at least one diode, preferably of the z diode, is connected to the two-wire line which is connectable at the second end and an anode is connected to the adapter connection cable located at the first end or that an overvoltage protection resistor for overvoltage protection is connected in parallel with the resistor.

A further embodiment of the field device adapter in turn provides for the communication resistor to be a part of the supply electronics unit and for the voltage tapping to take place via the communication resistor.

A further advantageous embodiment of the field device adapter further provides a connection terminal for electrically connecting and/or contacting the two-wire line to the adapter electronics unit, wherein the connection terminal is preferably arranged in the region of the second end in the adapter chamber.

A further advantageous embodiment of the field device adapter provides for the field device adapter, especially the adapter housing, to take the form of a PG cable connection.

A further advantageous embodiment of the field device adapter provides for the second end of the adapter housing to be designed in such a way that the field device adapter is mechanically connectable to a cable gland connection of a field device via an M20 thread.

A further advantageous embodiment of the field device adapter provides for the adapter electronics unit to comprise at least one radio unit which preferably has an antenna for transmitting the radio signals and/or for receiving the radio signals and a radio module for converting the radio signals.

With regard to the automation field device, the object is achieved by an automation field device for acquiring and/or controlling a process variable, which comprises the following:
a field device housing having at least one housing opening;
a field device electronics unit disposed within the field device housing and designed to communicate data in the form of two-conductor signals, especially two-conductor signals based on a HART protocol;
a field device adapter according to one or more of the preceding claims, wherein the field device adapter is mechanically attached at the first end to the at least one housing opening and the adapter electronics unit is electrically connected to the field device electronics unit via the adapter connection cable, so that the two-conductor signals between the field device electronics unit and a two-wire line which can be connected at the second end are transferred by the adapter electronics unit and the adapter electronics unit is further designed to convert the two-conductor signal into a radio signal or vice versa and to transmit or receive the same by radio.

BRIEF DESCRIPTION OF THE DRAWINGS

The invention is explained in more detail based upon the following drawings. The following is shown.

DETAILED DESCRIPTION

Figure 1:
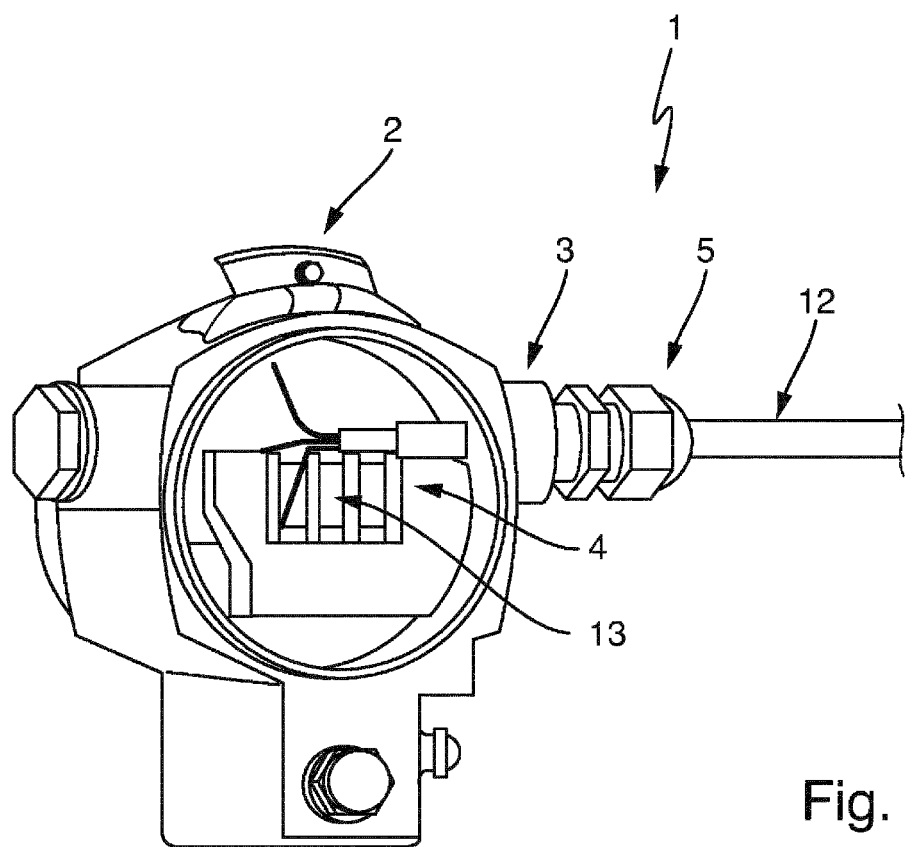
FIG. 1 shows a schematic representation of a two-wire field device, as is currently found in a variety of existing automation systems and with which data can be communicated exclusively by wire via a two-wire line.

FIG. 1 shows schematically a two-wire field device which comprises a metallic housing 2 within which a field device electronics unit 4 is arranged. The field device electronics unit 4 is designed in such a way as to have connection terminals 13 via which a two-wire line 12 is electrically connected. The field device electronics unit 4 and thus the field device 1 are connected via the two-wire line to a superordinate unit, not shown separately in FIG. 1, in order to communicate data with the superordinate unit by wire. Here the measurement or control values are communicated in analog form as a main process variable via the two-wire line 12 as a 4-20 mA current signal, and all other data are transferred in accordance with the HART standard in the form of a digital two-conductor signal.

To enable the two-wire line coming from outside the housing 2 to be put into electrical contact with the field device electronics unit arranged in the housing 2, the metallic housing 2 has a housing opening 3. A cable gland 5 is introduced into the housing opening 3 so that the two-wire line 12 can be introduced into the housing 2 through the cable gland 5. The cable gland 5 preferably takes the form of a PG cable gland, i.e. a cable gland with a heavy-gauge steel conduit thread, in accordance with the DIN EN 62444 standard published in May 2014. The cable gland 5 can, for example, take the form of an M20 PG cable gland, i.e. having an outer diameter of 20 mm.

Figure 2:
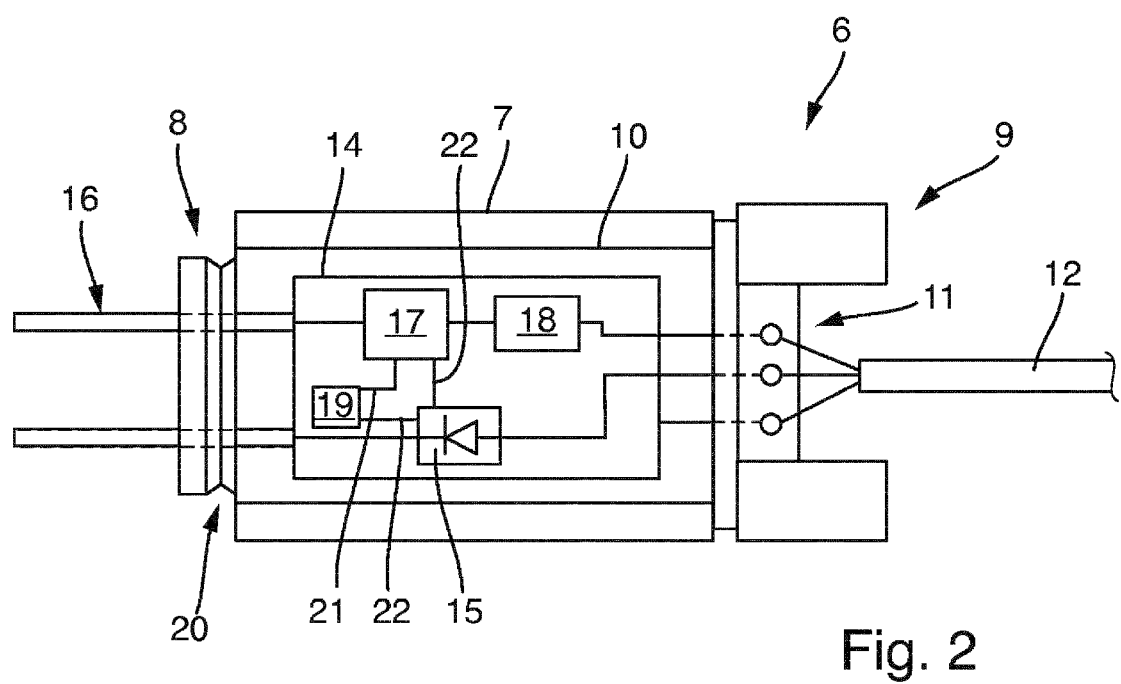
FIG. 2 shows a schematic representation of a field device adapter according to the present disclosure.

FIG. 2 shows a schematic representation of a field device adapter 6 according to the invention. The field device adapter 6 has an adapter housing 7 with an adapter chamber 10. The adapter housing 7 is designed in such a way that the field device adapter 6 can be mechanically fastened at a first end to a cable gland 5, especially a PG cable connection, of a field device 1. The first end of the adapter housing preferably has a M20 thread for this purpose. At a second end 9 opposite the first end 8, the adapter housing 7 is designed in such a way that a two-wire line 12 for data transfer can be electrically connected to the field device adapter 6. For example, a connection terminal 11 located at the second end can be used for this purpose. Furthermore, the field device adapter 6 has an adapter electronics unit 14 and a supply electronics unit 15 which are likewise arranged within the adapter chamber 10. As shown in FIG. 2, the supply electronics unit 15 can be embodied as a part of the adapter electronics unit 14 or be separate from the adapter electronics unit 14.

The supply electronics unit 15 may comprise a voltage reference, at least one diode, preferably a z diode, or a resistor, and may be designed to provide a supply voltage for voltage supply to the adapter electronics unit 14 via a voltage tap.

In the simplest case, the supply voltage is provided via a voltage tap via the voltage reference, the at least one diode, preferably z diode, or the resistor. The diode is arranged such that a cathode is connected to the two-wire line 12 which can be connected at the second end 9 and an anode is connected to the adapter connection cable 16 located at the first end 8. A plurality of corresponding series-connected diodes is also conceivable. In the case whereby the supply electronics unit 15 has a resistor via which the voltage tapping takes place, a further resistor parallel to the resistor can be provided for overvoltage protection.

The adapter electronics unit 14, which is fed by the supply voltage provided by the supply electronics unit 15, is connected at the first end 8 to the adapter connection cable 16 and at the second end 9 to the two-wire line 12 by the connection terminals 11. The adapter electronics unit 14 is designed such that two-conductor signals, that is to say the 4-20 mA-based analog two-wire current signal as well as the two-wire digital signal formed according to the HART standard, communicate in both directions between the two-wire line 12 and the adapter connecting cables 16. In other words, the adapter electronics unit forwards the two-conductor signals in both directions. Furthermore, the adapter electronics unit 14 is designed to tap off the two-conductor signals, especially the digital two-conductor signals which are transferred according to the HART standard, and to convert them into radio signals and transmit the same by radio. The adapter electronics unit 14 can, however, not only be designed for transmitting the radio signals, but also for receiving radio signals and converting the radio signals into digital two-conductor signals which are then fed via the connection cable 16 to a field device electronics unit 4. The conversion and transmission or reception is effected via a radio unit 19 which for this purpose has a radio module for the conversion and an antenna for transmitting or receiving. In this way, for example, a field device can be wirelessly parametrized via radio signals.

For converting the digital two-conductor signals into signals suitable for transmission by means of the radio unit and vice versa, the adapter electronics unit 14 comprises a HART modem which is connected for communication with the radio unit 19, for example by means of a serial interface 21, such as UART. In order for the adapter electronics unit 14 to be able to communicate two-wire digital signals to the field device 1, the HART modem is designed as a secondary master and the adapter electronics unit 14 also has a communication resistor 18. A voltage modulation corresponding to the digital two-conductor signal to be transmitted is implemented via the communication resistor 18.

The adapter electronics unit 14 and the radio unit 19 can furthermore be designed such that the analog current signal or two-conductor signal is also captured or tapped by the adapter electronics unit 14 via the communication resistor 18 and converted into radio signals by the radio unit 19 so that even the analog two-conductor signals are transferable by radio.

The radio unit 19 is designed in such a way that in particular radio signals may be in accordance with a Bluetooth protocol or variant derived therefrom, a 6LoWPAN protocol, a WirelessHART protocol, and/or a 6TiSCH protocol.

Figure 3:
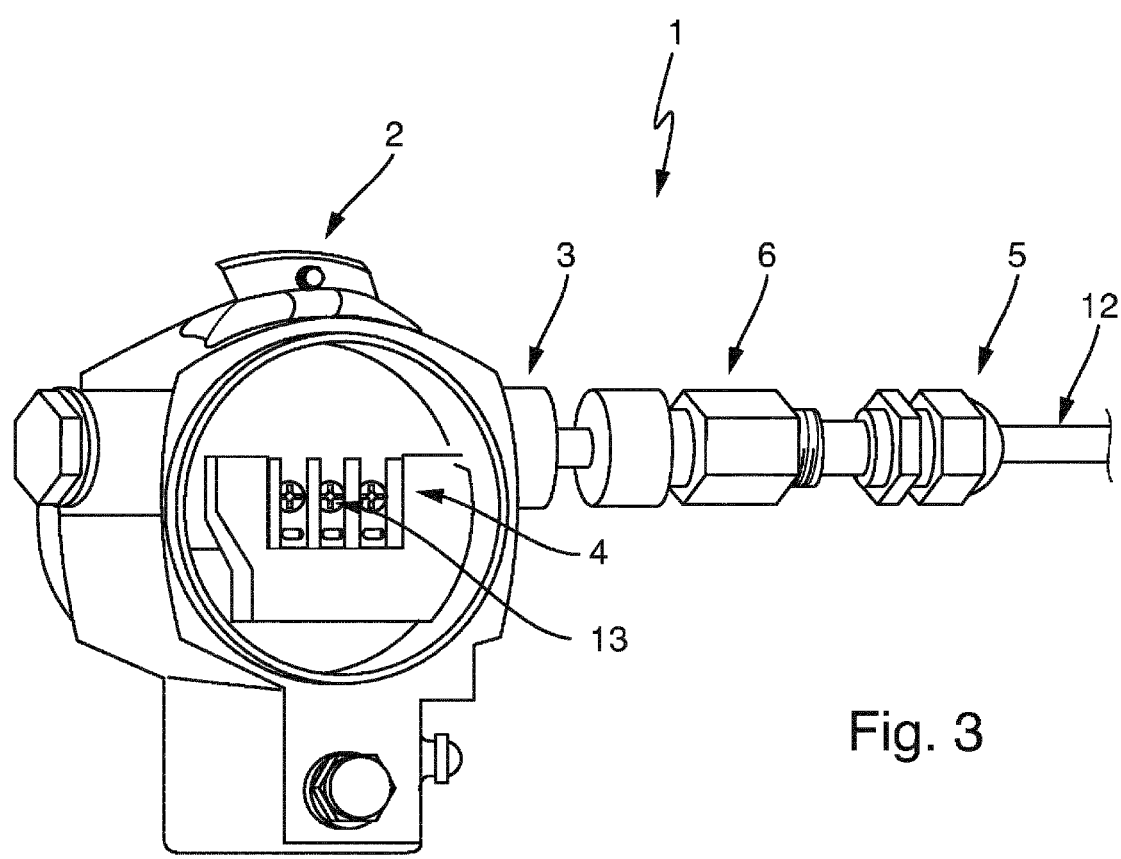
FIG. 3 shows a schematic representation of a field device to which a field device adapter is attached.

FIG. 3 shows a schematic representation of a field device 1 to which a field device adapter 6 as described above is attached. As shown in FIG. 3, the field device adapter 6 can be arranged in such a way that it is located between the housing opening 3 of the field device 1 and the cable connection 5. In this case, the second end 9 of the adapter housing 7 is designed in such a way that the cable gland 5 can be fastened in place. For example, the second end 9 can also take the form of a PG cable gland with an M20 thread in accordance with the DIN EN 62444 standard published in May 2014.

Alternatively, the field device adapter 6 can also be designed in such a way that it itself serves as a cable gland and thus when it is fitted to the field device no separate cable connection is required. It goes without saying that in this case the second end 9 does not necessarily have to take the form of a PG cable gland.

1 Automation field device
2 Field device housing
3 Housing opening
4 Field device electronics unit
5 Cable gland
6 Field device adapter
7 Adapter housing
8 First end of the adapter housing
9 Second end of the adapter housing
10 Adapter chamber
11 Connection terminals of the field device adapter
12 Two-wire line
13 Connection terminals of the field device
14 Adapter electronics unit
15 Supply electronics unit
16 Adapter connection cable
17 HART modem
18 Communication resistor
19 Radio unit
20 M20 thread for mechanically connecting the adapter to a cable gland of a field device
21 Serial interface
22 Lines for the power supply

The invention claimed is:

1. A field device adapter for wireless data transfer, comprising:
    an adapter housing having a first end and a second end, the first end being designed such that the field device adapter can be mechanically connected to a field device, and the second end being designed such that a two-wire line for data transfer can be electrically connected to the field device adapter, wherein the adapter housing also has an adapter chamber between the first and second ends;

a voltage reference embodied to provide a supply voltage independently of a current on the two-wire line, at least one diode, or a resistor, wherein the voltage reference, the at least one diode, or the resistor is arranged in the adapter chamber and designed to provide the supply voltage via a voltage tap at the two-wire line that is connectable at the second end, wherein the voltage tapping takes place across the voltage reference, the at least one diode, or the resistor;

an adapter electronics unit arranged in the adapter chamber and to which the supply voltage is fed; and an adapter connection cable located at the first end for electrically connecting the adapter electronics unit to a field device electronics unit of the field device that is connectable at the first end, wherein the adapter electronics unit is designed to communicate two-conductor signals between the field device electronics unit electrically connectable at the first end by means of the adapter connection cables and the two-wire line connectable at the second end, and wherein the adapter electronics unit is also designed to convert the two-conductor signals into radio signals, to convert radio signals into the two-conductor signals, and to transmit and receive the radio signals by radio.

2. The field device adapter according to claim 1, wherein the adapter electronics unit is designed to convert digital two-conductor signals based on a HART protocol into radio signals and to convert radio signals into digital two-conductor signals based on the HART protocol.

3. The field device adapter according to claim 2, wherein the adapter electronics unit includes a HART modem which carries out the conversion of the digital two-conductor signals based on the HART protocol into radio signals and the conversion of the radio signals into digital two-conductor signals based on the HART protocol.

4. The field device adapter according to claim 3, wherein the HART modem is designed as a secondary master in accordance with the HART protocol.

5. The field device adapter according to claim 1, wherein the adapter electronics unit further includes a communication resistor arranged between the two-wire line that is connectable at the second end and the adapter connection cable located at the first end, wherein the adapter electronics unit is designed to receive the radio signals and convert the received radio signals into the two-conductor signals with the aid of the communication resistor and to route the converted two-conductor signals to the field device electronics unit that is electrically connectable by the adapter connection cables.

6. The field device adapter according to claim 5, wherein the adapter electronics unit is further designed to convert analog two-conductor signals based on a 4-20 mA standard into radio signals and to convert radio signals into an analog two-conductor signal based on the 4-20 mA standard with the aid of the communication resistor.

7. The field device adapter according to claim 2, wherein the adapter electronics unit is further designed to convert the digital two-conductor signals based on the HART protocol into radio signals in accordance with one of the following radio protocols:
a Bluetooth protocol,
a 6LoWPAN protocol,
a WirelessHART protocol, and
a 6TiSCH protocol.

8. The field device adapter according to claim 1, wherein the at least one diode is arranged such that a cathode of the at least one diode is connected to the two-wire line which is connectable at the second end and an anode of the at least one diode is connected to the adapter connection cable located at the first end.

9. The field device adapter according to claim 1, wherein an overvoltage protection resistor for overvoltage protection is connected in parallel with the resistor.

10. The field device adapter according to claim 5, wherein the voltage tapping takes place via the communication resistor.

11. The field device adapter according to claim 1, further comprising:
a connection terminal for electrically connecting and/or contacting the two-wire line to the adapter electronics unit, wherein the connection terminal is arranged in the region of the second end in the adapter chamber.

12. The field device adapter according to claim 1, wherein the adapter housing takes the form of a PG cable gland.

13. The field device adapter according to claim 1, wherein the second end of the adapter housing is designed such that the field device adapter is mechanically connectable to a cable gland connection of the field device via an M20 thread.

14. The field device adapter according to claim 1, wherein the adapter electronics unit includes a radio unit which has an antenna for transmitting the radio signals and/or for receiving the radio signals and a radio module for converting the radio signals.

15. An automation field device for capturing and/or controlling a process variable, comprising:
a field device housing having at least one housing opening;
a field device electronics unit disposed within the field device housing and designed to communicate data in the form of two-conductor signals based on a HART protocol; and a field device adapter, including:
an adapter housing having a first end and a second end, the first end being designed such that the field device adapter can be mechanically connected to a field device, and the second end being designed such that a two-wire line for data transfer can be electrically connected to the field device adapter, wherein the adapter housing also has an adapter chamber between the first and second ends;
a voltage reference embodied to provide a supply voltage independently of a current on the two-wire line, at least one diode, or a resistor, wherein the voltage reference, the at least one diode, or the resistor is arranged in the adapter chamber and designed to provide the supply voltage via a voltage tap at the two-wire line that is connectable at the second end, wherein the voltage tapping takes place across the voltage reference;
an adapter electronics unit arranged in the adapter chamber and to which the supply voltage is fed; and
an adapter connection cable located at the first end for electrically connecting the adapter electronics unit to a field device electronics unit of the field device that is connectable at the first end,
wherein the adapter electronics unit is designed to communicate two-conductor signals between the field device electronics unit electrically connectable at the first end by means of the adapter connection cables and the two-wire line connectable at the second end, and wherein the adapter electronics unit is also designed to convert the two-conductor signals into radio signals, to convert radio signals into the two-conductor signals, and to transmit and receive the radio signals by radio, wherein the field device adapter is mechanically attached at the first end to the at least one housing opening and the adapter electronics unit is electrically connected to the field device electronics unit via the adapter connection cable so that the two-conductor signals between the field device electronics and a two-wire line which can be connected at the second end are transferred by the adapter electronics unit.

* * * * *